United States Patent

Skala

[11] 4,020,798
[45] May 3, 1977

[54] INTERNAL COMBUSTION ENGINE FUELED BY NaK

[76] Inventor: Stephen F. Skala, 3839 S. Wenonah Ave., Berwyn, Ill. 60402

[22] Filed: May 19, 1975

[21] Appl. No.: 578,527

Related U.S. Application Data

[63] Continuation-in-part of Ser. No. 301,285, Oct. 27, 1972, abandoned, and a continuation-in-part of Ser. No. 435,117, Jan. 21, 1974, abandoned, and a continuation-in-part of Ser. No. 464,454, April 26, 1974, abandoned.

[52] U.S. Cl. .................. 123/1 A; 123/3; 123/25 E
[51] Int. Cl.² ........................ F02B 45/00
[58] Field of Search ............. 123/1 A, 25 E, 25 F, 123/23, 3; 60/39.46 R, 39.46 M, 649, 670; 110/1 H, 1 J; 44/51

[56] References Cited

UNITED STATES PATENTS

| | | | |
|---|---|---|---|
| 2,706,890 | 4/1955 | Schmidt | 60/649 |
| 3,418,804 | 12/1968 | Meijer | 122/21 X |
| 3,664,134 | 5/1972 | Seitz | 123/1 A |

OTHER PUBLICATIONS

"Studies of Fast Reactions which Evolve Gases, The Reaction of Sodium–Potassium Alloy with Water in the Presence and Absence of Oxygen" – M. Kilpatrick et al., The Journal of Physical Chemistry, vol. 57, pp. 385–390 (1953).

Primary Examiner—Charles J. Myhre
Assistant Examiner—Ira S. Lazarus
Attorney, Agent, or Firm—Dominik, Knechtel, Godula & Demeur

[57] ABSTRACT

The liquid metal sodium-potassium allow called NaK reacts with water and air to release energy and to form hydroxides of NaK. The hydroxides are transported in solution by pipeline to be regenerated to NaK metal by electrolysis, the NaK metal being transported by a second pipeline to be dispensed to automobiles. The present invention is an internal combustion engine based on an explosive reaction of NaK and water sprays in the presence of air. A two cycle piston engine with NaK and water injected near maximum compression is preferred.

3 Claims, 1 Drawing Figure

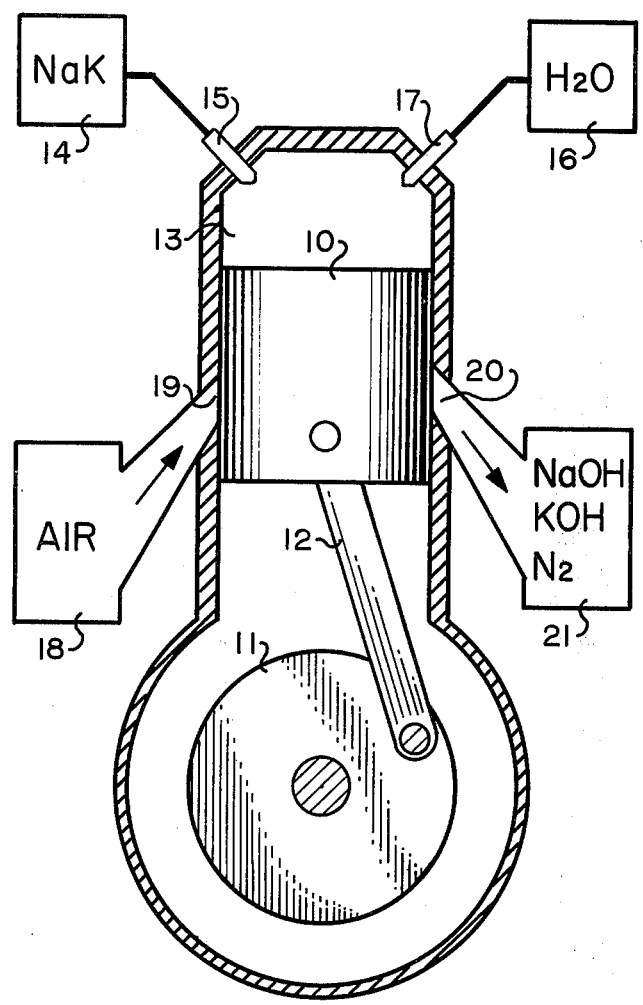

INTERNAL COMBUSTION ENGINE FUELED BY NaK

This application is a continuation-in-part of Ser. No. 301,285 filed Oct. 27, 1972 by the same applicant, and now abandoned and Ser. No. 435,117 filed Jan. 21, 1974, now abandoned; and is now a continuation-in-part of Ser. No. 464,454, filed Apr. 26, 1974, now abandoned.

This invention relates to improved internal combustion engines utilizing sodium-potassium fuel and water to provide a combustion mixture in the presence of oxygen to operate open cycle heat engines.

The known operation of heat engines is to convert heat energy into useful work by expanding motion against a load. Such an energy conversion process if based on well known thermodynamic cycles in which a working fluid absorbs heat and develops mechanical energy by expanding under increased pressure against a movable member. The process is repeated by returning the movable member to its initial position while compressing a cold working fluid. The mechanical energy developed on hot expansion exceeds that expended on cold compression.

The working fluid of internal combustion engines may be considered as oxygen or air in which heat producing chemical changes occur in the internal combustion chamber. Known internal combustion engines include four cycle gasoline engines and diesel engines. In a typical diesel cycle, air is drawn into a cylinder, the air is compressed by a piston, fuel is then injected and ignited. The increased gas pressure forces the piston to move against the load, and the products of combustion are exhausted. Alkali metals have been used as a heat source for external combustion engines as shown by W. H. Percival in U.S. Pat. No. 3,353,349, using lithium or sodium oxidized by fluorocarbons. Such fluorocarbon oxidizers are deemed appropriate by Percival for intended undersea vehicles, but they are not sufficiently economical for general application, such as automotive use.

It is accordingly an object of the present invention to provide an improved internal combustion engine utilizing new energy forms derived from sodium-potassium fuel. It is a feature of this object that such sodium-potassium fuel is readily and economically oxidized with common water, and that the by-products of combustion are collected for later regeneration and use.

Such objects are now attained together with still other objects which will occur to practitioners from time to time by considering the invention of the following disclosure including a drawing wherein:

FIG. 1 is a highly schematic representation of a cylinder assembly internal combustion engine utilizing fuel and oxidizer sources.

The internal combustion engines herein utilize sodium-potassium fuel, also known as NaK. The NaK fuel is combined with water and oxygen, as in the form of air. The air may be considered as a working fluid which undergoes chemical changes during the reaction in the liberation of heat, thereby relating to internal combustion engines. Sodium and potassium metals are abundant and recoverable from large reserves, and their hydroxide by-products can be regenerated to starting metals by means such as electrolysis. The eutectic NaK remains liquid to −11° C, and can be transported by pipelines, as can be a solution of its by-product hydroxides. The internal combustion engines herein provide a part of a recycleable fuel system in which NaK fuel and its reaction products are movable between a refining means and energy using vehicles.

The reaction of alkali metals with water and air is represented by:

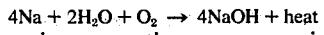

$$4Na + 2H_2O + O_2 \rightarrow 4NaOH + heat$$

The above reaction occurs rapidly when the alkali metal and the water are in the form of droplets, and the preferred form provides injecting these materials into an internal combustion chamber. Reference may be made to "Studies of Fast Reactions Which Evolve Gases. The Reaction of Sodium-Potassium Alloy With Water in the Presence and Absence of Oxygen", M. Kilpatrick, et al, the Journal of Physical Chemistry, Vol. 57, pp. 385–390 (1953). Such article teaches an explosive reaction which occurs in about two milliseconds following contact ot the reactants.

Referring now to the drawing, FIG. 1 illustrates a two cycle internal combustion engine provided with a source of NaK fuel, a source of water, and means for introducing air into the combustion chamber. A piston 10 is connected to a crank 11 through a connecting rod 12, said piston reciprocating in a cylinder 13.

A source of NaK fuel or tank 14 is joined to an injector means 15 which introduces the NaK fuel in droplet form into an internal combustion chamber within cylinder 13. A water source or tank 16 is joined to water injector means 17 which likewise introduces water in droplet form into the internal combustion chamber of the cylinder. A source of pressurized air 18 is connected to the internal combustion chamber of the cylinder through an intake port 19. An exhaust port 20 passes reaction products out of the internal combustion chambers to collector means 21 which stores the hydroxides and rejects the gaseous byproducts, principally nitrogen, to the atmosphere, by means not shown. In operation, air enters the cylinder from source 18 as the piston 10 approaches the bottom of its stroke. The air is compressed upon the upstroke of the piston and water is injected. At the top of the stroke, NaK fuel is injected as a fine spray and reacts with the water to form the hydroxide by-products, hydrogen and heat. The hydrogen reacts with the oxygen to form water and more heat. The pressure of the remaining gases increases and power is developed on the downstroke. As the piston passes the exhaust port 20, pressure is released. The intake port 19 is then opened and a fresh charge of air flushes and fills the cylinder. A similar reaction can occur in a four cycle engine wherein a carburator adds water droplets to the air intake and NaK is injected into the water air mixture near the top of the compression stroke. Other internal combustion engines based on similar cycles such as a NaK-water-air rotary Wankel engine are within the scope of this invention. A general description of an engine with similar components may be found in the "Encyclopedia Britannica" under the entry "Diesel Engine".

The claims of the invention are now presented and the terms of such claims may be further understood by reference to the preceding specification and the view of the drawing.

What is claimed is:

1. In an engine having an internal combustion chamber and power generating displaceable engine means in said combustion chamber, the improvement comprising a source of liquid sodium-potassium fuel, injection means joining said source of fuel to said internal combustion chamber, a source of water, injection means joining said source of water to said combustion chamber, means to introduce oxygen into said internal combustion chamber, said heat of explosive reaction directly operating said power generating displaceable engine means, and collector means outside said internal combustion chamber to collect and store gaseous and hydroxide by-products of combustion.

2. In a combustion engine having the features of claim 1 wherein said means introduce oxygen as compressed air into the internal combustion chamber.

3. In a combustion engine having the features of claim 1 wherein said power generating displaceable engine means is a piston and cylinder assembly, including mechanical means responsive to the movement of the piston.

* * * * *

UNITED STATES PATENT OFFICE
CERTIFICATE OF CORRECTION

Patent No. 4,020,798     Dated May 3, 1977

Inventor(s) Stephen F. Skala

It is certified that error appears in the above-identified patent and that said Letters Patent are hereby corrected as shown below:

On The Title Page, under item 63, line 3,

"(No. 435,117, Jan. 21, 1974, abandoned)" should read

--No. 457,207, Apr. 2, 1974, Pat. No. 3,911,284, --.

Column 1, lines 3 and 4, "Ser. No. 435,117 filed Jan. 21, 1974, now abandoned;" should read -- Ser. No. 457,207 filed Apr. 2, 1974 now U. S. Patent No. 3,911,284; --.

Signed and Sealed this

Eighth Day of August 1978

[SEAL]

Attest:

RUTH C. MASON
Attesting Officer

DONALD W. BANNER
Commissioner of Patents and Trademarks